United States Patent
Hösel

(10) Patent No.: US 6,694,211 B2
(45) Date of Patent: Feb. 17, 2004

(54) SYSTEM AND METHOD FOR CONTROLLING A GROUP OF FIBER PROCESSING MACHINES

(75) Inventor: Fritz Hösel, Mönchengladbach (DE)

(73) Assignee: Trützschler GmbH & Co. KG, Mönchengladbach (DE)

( * ) Notice: Subject to any disclaimer, the term of this patent is extended or adjusted under 35 U.S.C. 154(b) by 0 days.

(21) Appl. No.: 10/096,868

(22) Filed: Mar. 14, 2002

(65) Prior Publication Data

US 2002/0095235 A1 Jul. 18, 2002

Related U.S. Application Data

(63) Continuation of application No. 09/986,198, filed on Nov. 7, 2001, now abandoned.

(30) Foreign Application Priority Data

Nov. 7, 2000 (DE) .......................... 100 55 025

(51) Int. Cl.[7] .............................. G06F 19/00
(52) U.S. Cl. ....................... 700/142; 112/155
(58) Field of Search ................. 700/142, 130, 700/9, 83, 84, 143; 112/155, 102.5, 80.23, 470.04, 470.06; 57/264

(56) References Cited

U.S. PATENT DOCUMENTS

| | | | |
|---|---|---|---|
| 4,364,153 A | 12/1982 | Beneke et al. | |
| 4,805,268 A | 2/1989 | Leifeld | |
| 5,313,896 A | * 5/1994 | Hashiride | 112/155 X |
| 5,517,404 A | 5/1996 | Biber et al. | |
| 5,801,949 A | 9/1998 | Raasch et al. | |
| 5,805,452 A | * 9/1998 | Anthony et al. | 700/142 |

FOREIGN PATENT DOCUMENTS

| | | |
|---|---|---|
| CH | 661 291 | 7/1987 |
| DE | 39 06 508 | 9/1989 |
| DE | 39 24 779 | 1/1991 |
| DE | 41 13 384 | 11/1991 |
| DE | 41 27 990 | 2/1993 |
| DE | 42 29 234 | 3/1993 |
| EP | 0 409 772 | 1/1991 |
| EP | 0 497 535 | 8/1992 |
| EP | 0 832 997 A2 | 4/1998 |
| EP | 0 943 572 | 3/1999 |
| JP | 61063721 A | 4/1986 |
| WO | 92/13121 | 8/1992 |
| WO | WO 96/11292 A2 | 4/1996 |
| WO | 97/27351 | 7/1997 |

OTHER PUBLICATIONS

Leifeld, "Stand und Trend der Automatisierung in der Spinnereivorbereitung", Melliand Textilberichte, 9/87, pp. 617, 618.

"Vom Ballen zum Vlies" ("From bale to web"), Trützschler brochure, 5 pages.

* cited by examiner

*Primary Examiner*—Peter Nerbun
(74) *Attorney, Agent, or Firm*—Venable LLP; Robert Kinberg; Stuart I. Smith

(57) ABSTRACT

A control system for a group of fiber processing machines includes a superordinate control console; and separate machine-specific control consoles connected to each respective fiber processing machine. The superordinate control console and the machine-specific control consoles are connected to one another by control and regulating devices via a network. The superordinate control console is utilized for all and only for those inputs and displays which require no personal control and display acknowledgment at the machines and the machine-specific control consoles are utilized for all and only for those inputs and displays which, for the operation of the machines require a personal control and display acknowledgement at the machines.

16 Claims, 4 Drawing Sheets

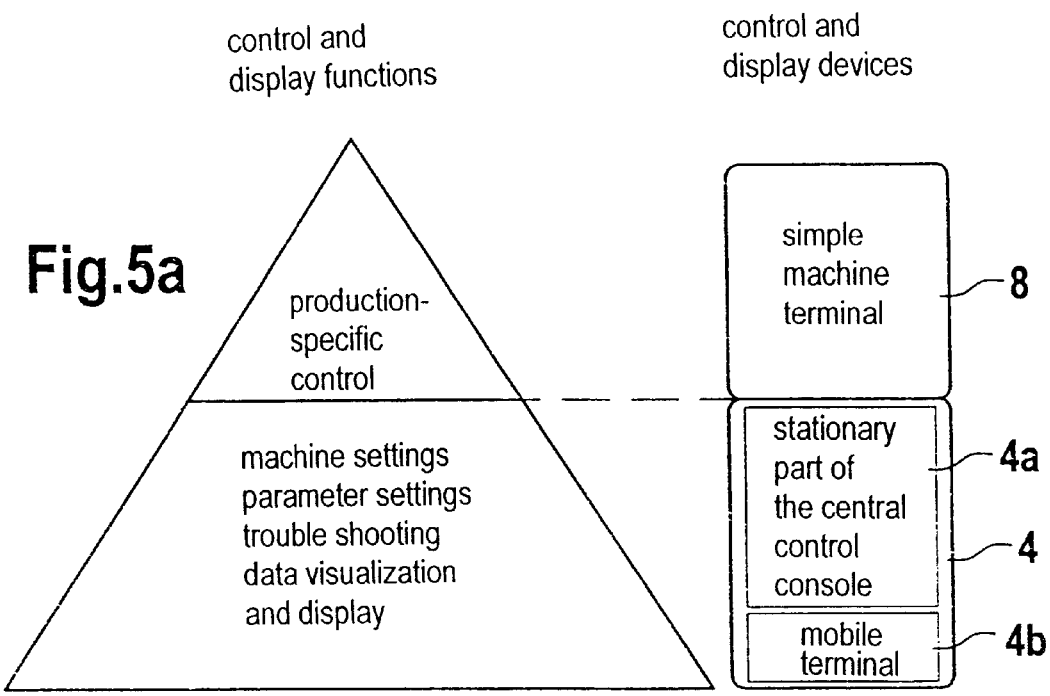
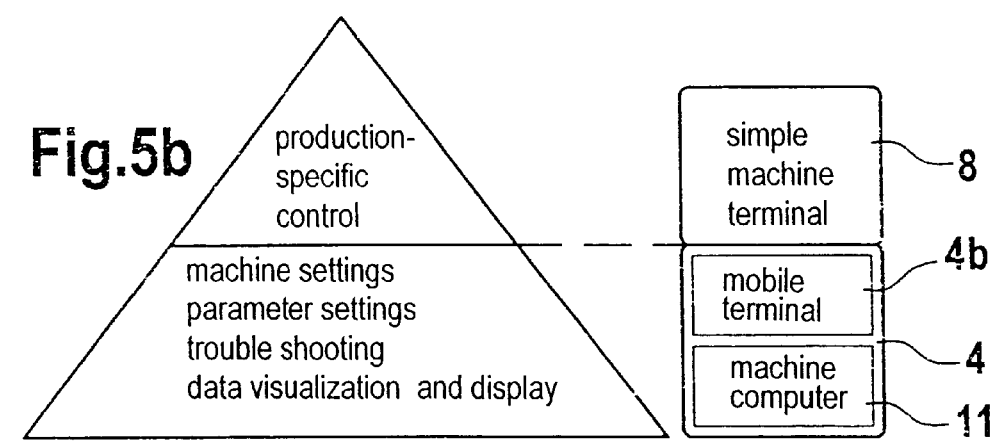
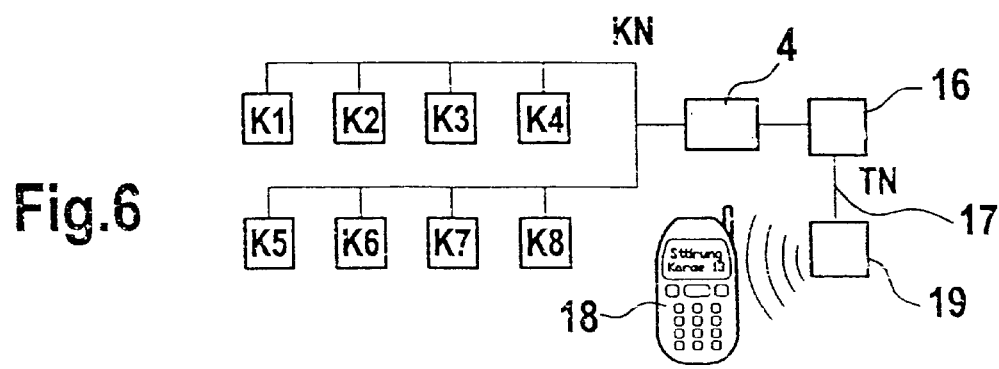

SYSTEM AND METHOD FOR CONTROLLING A GROUP OF FIBER PROCESSING MACHINES

CROSS REFERENCE TO RELATED APPLICATION

This application is a continuation of application Ser. No. 09/986,198 filed Nov. 7, 2001 now abandoned.

This application claims the priority of German Application No. 100 55 025.8 filed Nov. 7, 2000, which is incorporated herein by reference.

BACKGROUND OF THE INVENTION

This invention relates to a system and a method for controlling a group of fiber processing machines, such as carding machines and/or draw frames. The system has at least one superordinate control console, and each machine has a machine-specific control console. All control consoles are connected with one another by control and regulating devices (computers) via a network.

In practice, up-to-date textile machines have high- performance controls, by means of which a plurality of functions may be performed and controlled. This applies particularly to the machine control by operating personnel. Such a control has become increasingly more complex and more difficult to overview and to manipulate because of the increasing number of choices as concerns input and setting. Also, more and more information, data and details are available which have to be prepared and made visible for the operating or maintenance personnel. To meet these requirements, complex and expensive control consoles or visual indicating devices are being used. Such devices are computers with monitor screens, keyboards and/or touch screens. It is a significant disadvantage of such an arrangement that the equipment is, as a rule, very expensive. The expenses are often several times the cost of conventional equipment and such a cost applies to each and every machine. Particularly high costs are encountered in case a large number of machines are used which may be desirable from a technological or manufacturing point of view. In addition, the numerous functions of these devices are, as a rule, utilized only relatively rarely, that is, only in certain situations.

International patent document WO 92/13121, to which corresponds U.S. Pat. No. 5,517,404, describes a process control system which has a master computer and a network having a computer of a machine control arrangement of, for example, a pre-yarn transport system. Each computer has a dedicated memory and drive. The drivers determine the necessary interfaces for the communication of the computers with their user interfaces, designated as display devices, controls and printers. The system is programmed and configured in such a manner that the master computer may perform machine control support via the user interface of the respective machine; that is, the master computer may send control commands over the network and the machine controls may receive and obey such control commands so that the condition of the user interface is determined by the master computer via the respective control. Such a system is very complex and expensive. It is a particular drawback that the operation of the machines is controlled from the master computer. The disadvantage resides in the manipulation of complex control consoles for merely a few desired inputs for the manufacturing operation of the respective individual machines, such as on and off switching, coiler can replacement, and indicator displays.

SUMMARY OF THE INVENTION

It is an object of the invention to provide an improved system and method of the above-outlined type, from which the discussed disadvantages are eliminated and which is structurally significantly simpler and further ensures a simplified machine control and display for the personnel.

This object and others to become apparent as the specification progresses, are accomplished by the invention, according to which, briefly stated, the control system for a group of fiber processing machines includes a superordinate control console; and separate machine-specific control consoles connected to each respective fiber processing machine. The superordinate control console and the machine-specific control consoles are connected to one another by control and regulating devices via a network. The superordinate control console is utilized for all and only for those inputs and displays which require no personal control and display acknowledgment at the machines and the machine-specific control consoles are utilized for all and only for those inputs and displays which, for the operation of the machines require a personal control and display acknowledgement at the machines.

The measures according to the invention provide for a significant system-wise simplification as well as a simplified machine control and display. Thus, according to the invention, all machines belonging to one group or one system are coupled with a high-performance communication network and may exchange data among themselves or with other devices. To the network a superordinate (central) control console is coupled which centrally performs all complex setting, parameter-setting and inputting steps. In addition, a great number of data pertaining to the individual machines may be displayed, rendered visible, stored, exchanged and monitored. Additionally, at each machine a relatively simple and inexpensive terminal is provided, by means of which only those inputting steps are performed which are necessary for the actual manufacturing operation. Likewise, the display available there, only covers such a working field. In this manner a functional separation is effected between the machine operation and display required for the manufacture and those required for the machine-setting, parameter-setting, visualizing and error searching steps. The former is feasible exclusively via the machine terminal, whereas the latter may be performed only with elements of the central station. In this manner for each machine at all times those and only those devices are made available which are required for the normal, production-specific operation. The terminal required for such an operation may be relatively simple and inexpensive. The operation based on the display and on the entire handling is optimally adapted to the machine operator and his tasks. In particular, the displays and information may be available without dependence on language and only those keys are present which are required for the respective operating step. At the superordinate control console defined settings may be effectively and easily performed. Thus, for several machines (group) the same desired inputs may be made, parameters and settings may be taken over from machines, as well as data and results may be compared. It is a further advantage that because of the reduced number of more complex structural groups, the risk of outage as well as the required spare part acquisition are significantly diminished. Overall, the system according to the invention makes possible a practical and cost-effective solution without the need of taking into account substantial technical or technological limitations.

BRIEF DESCRIPTION OF THE DRAWINGS

FIG. 5a is a diagram illustrating the several control and display functions assigned to the control consoles, and a mobile terminal coupled to the stationary part of the superordinate control console.

FIG. 5b is a diagram illustrating the several control and display functions assigned to the control consoles, and a mobile terminal coupled to a machine control apparatus.

FIG. 6 is a diagram illustrating the connection of a modem to the central control console and the connection with a mobile telephone equipment via a wireless station.

DESCRIPTION OF THE PREFERRED EMBODIMENTS

Figure 1:
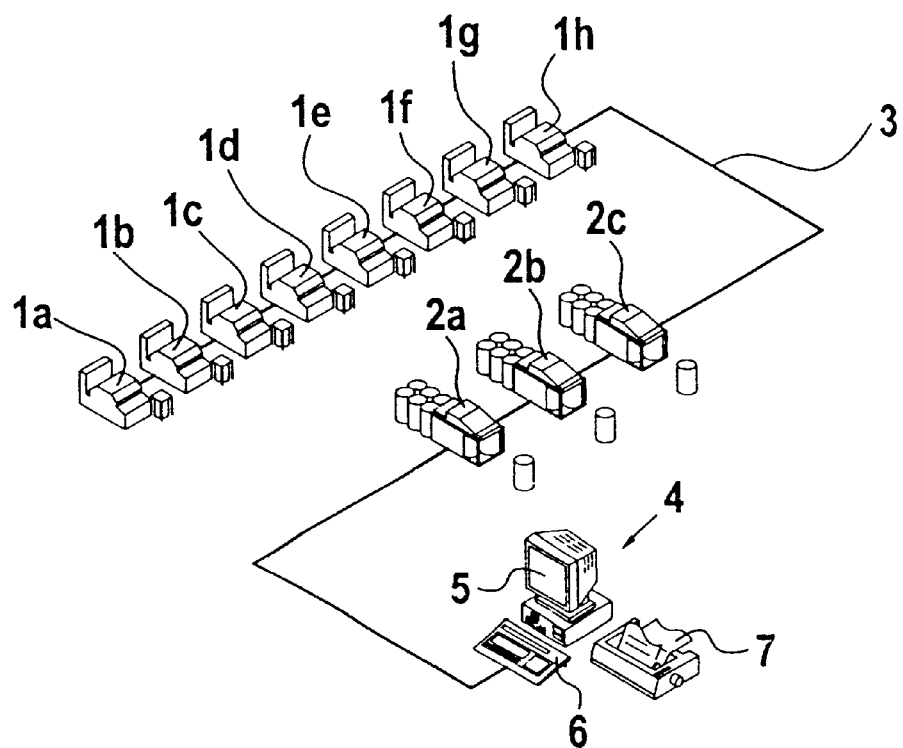
FIG. 1 is a schematic perspective view of a system composed of eight carding machines and three draw frames which are connected by a data network with a central handling and displaying apparatus (central control console).

FIG. 1 shows a spinning preparation system composed of eight carding machines 1a–1h and three draw frames 2a, 2b and 2c. The carding machines 1a–1h are connected by a data network 3 to a superordinate control console 4 which comprises, among others, a monitor screen 5 and a keyboard 6 and may further include a printer 7. The carding machines may be high-production DK 903 models, the draw frames may be high-production HSR 1000 models and the data network may be a TEXNET model, all manufactured by Trützschler GmbH & Co. KG, Mönchengladbach, Germany.

Figure 2:
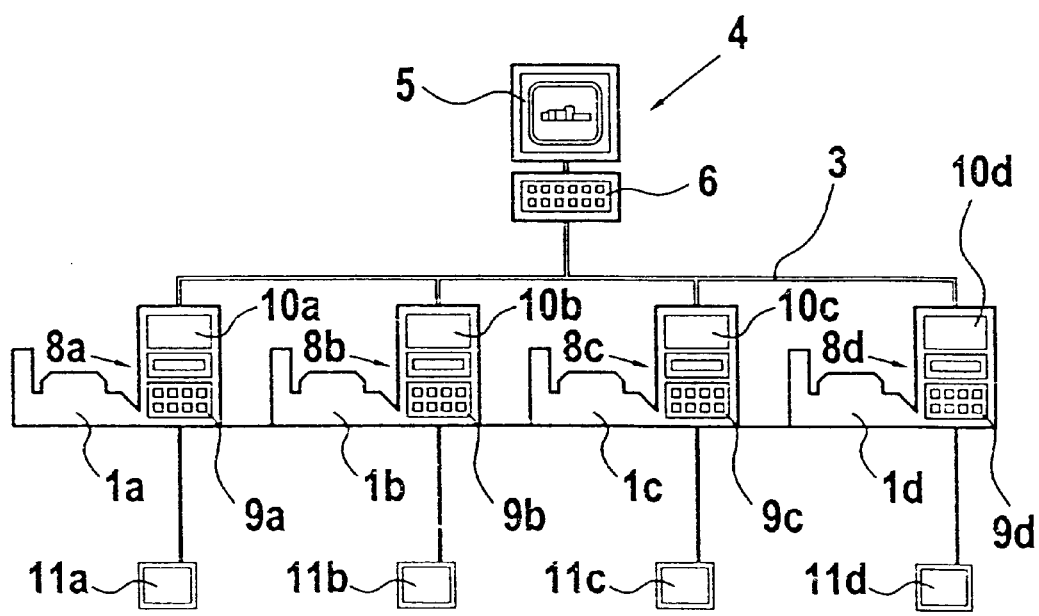
FIG. 2 is a schematic view of a system formed of four carding machines each having a machine-specific control console which are connected with the central control console by a data network.

As shown in FIG. 2, four carding machines 1a–1d are each connected with a respective, machine-specific control console 8a–8d, each having a respective keyboard 9a–9d and a monitor screen 10a–10d. Each control console 8a–8d is connected with a respective electronic machine control and regulating device 11a–11d, for example, a microcomputer.

As illustrated in FIGS. 1 and 2, all the carding machines and draw frames of the system are connected with a communication network 3 and can exchange data with one another or with other devices. The central control console 4 has a monitor screen 5, a touch screen, a keyboard 6 as well as capabilities to store data in large quantities over a long period of time. Based on this arrangement, it is feasible to centrally perform all complex machine-setting, parameter-setting and inputting steps. In addition, numerous data of the individual machines may be displayed, visualized, stored, exchanged and monitored.

Figure 3:
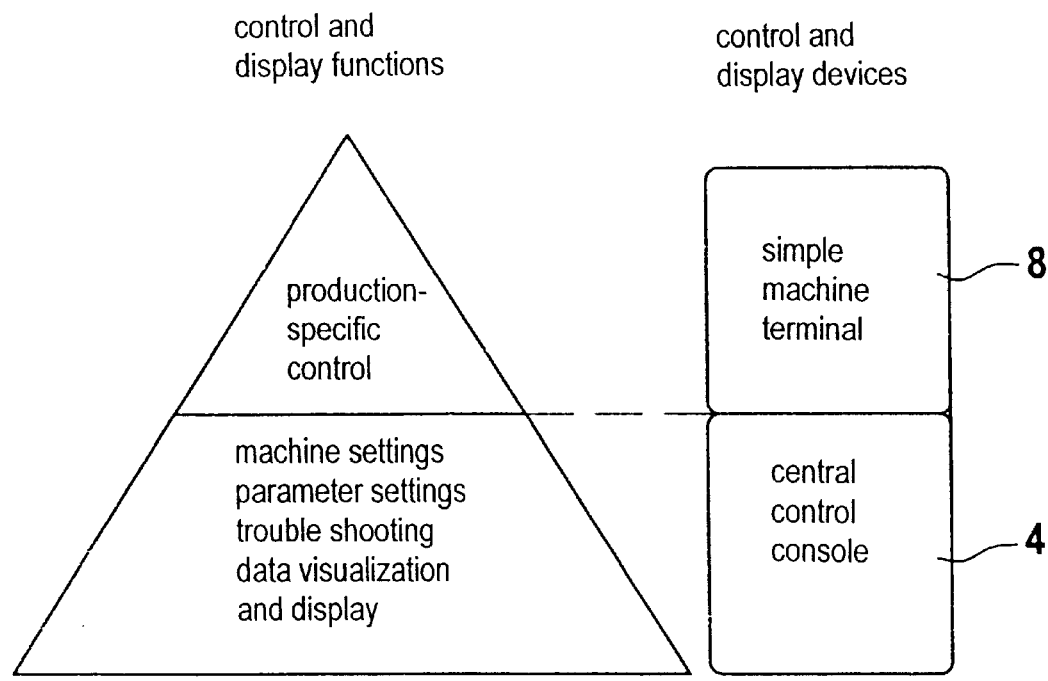
FIG. 3 is a diagram showing the several control and display functions assigned to the control consoles.

Each machine (such the cards 1a–1d according to FIG. 2) has a relatively simple and inexpensive respective terminal 9a–9d, by means of which only those inputting steps are performed which are necessary for the normal manufacturing operation. Likewise, the displays 10a–10d belonging to the respective terminals 9a–9d cover only such a working field. According to FIG. 3, a clear division is effected between a first group composed of control and display pertaining to the normal manufacturing operation and a second group required for the machine-setting, parameter-setting, and visualizing steps as well as error detection. The first group is exclusively feasible via the respective, machine-specific control consoles 8a–8d (simple machine terminals 9a–9d), while the second group is possible only by means of the elements of the central control console 4 which is shown as a one-part, stationary apparatus.

Thus, for example, as concerns the three draw frames 2a, 2b and 2c, the following division of control and display functions between the superordinate control console 4 and the machine-specific control consoles 31 (only one shown in FIG. 8) may be effected:

Only the following data are indicated at the display apparatus 5 of the central control console 4: as operating data: the initial tensions, the useful effect and the standstill periods; in connection with the quality of the drafting limits: the sliver fineness limits, the thickened portions in the sliver, spectrograms, coiler can-related quality data; in connection with monitoring: regulating parameters, drafting limits, sliver fineness limits, thickened locations in the sliver, CV values and electronic functions.

Only at the display devices 33 of the machine-specific control consoles 31 the following are shown: start/stop, error acknowledgement, coiler can replacement.

At the display device 5 of the central control console 4 and at the display devices 33 of the machine-specific control consoles 31 the following are shown: in connection with the operational data: delivery speed, production, drafts, rpm's, reasons for standstill; in connection with quality: CV values; and in connection with monitoring: safety devices.

The following are inputted only at the inputting device 6 of the central control console 4: draft, delivery speed, sliver fineness and quality limit values.

The following are inputted only at the inputting devices 32 (only one shown in FIG. 8) of the machine-specific control consoles 31: start/stop, coiler can replacement.

Figure 4:
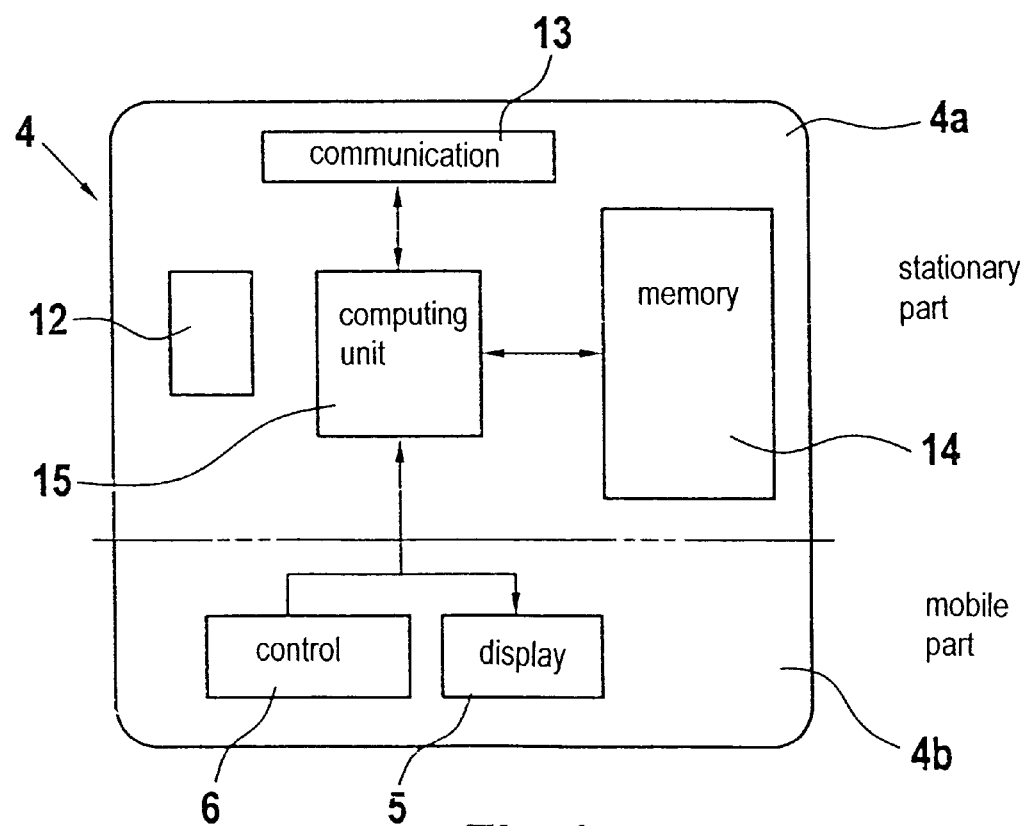
FIG. 4 is a diagram showing the central control console, having a stationary and a mobile part.

Because of technological reasons, certain machine-setting and parameter-setting steps must be combined with complex numeric or graphic indications which stem from the purely production-specific control and must be performed directly at the machine. For an effective and economical solution of this task, the central control console 4 is constructed in two parts as shown in FIG. 4. The first part 4a is stationary and contains mainly a current supply 12, the device 13 maintaining communication with the network 3, the memory 14, data administration as well as a computer 15. The control and display portion 4b is a mobile terminal separated from the stationary part 4a. Thus, all the machines have the possibility, on the one hand, to receive mechanically at a suitable location the mobile control and display part 4b of the central control console 4 and, on the other hand, to couple the mobile part 4b electrically with the machine computers 11a–11d (FIG. 2), 11 (FIG. 7), 30 (FIG. 8) which are also connected with the stationary part 4a of the central control console 4 via the network 3.

As shown in FIG. 5a, the "not production-specific control" is performed by the superordinate control console 4, but, in contrast to FIG. 4, in such a manner that the mobile terminal 4b, disconnected from the stationary part 4a, is associated with one of the machines.

FIG. 5b shows an embodiment in which a mobile terminal 4b is associated with a machine and takes care of the "not production-specific control" via a high performance machine computer 11.

The above-outlined arrangements result in the following advantages:

a. Each machine disposes of all devices but only of such devices which are necessary for a "normal" production-specific machine control. The control console 8 required for this purpose may be relatively simple and economical.

b. The machine control is optimally coordinated with the machine operator and his/her tasks based on the display 10 and the overall control. In particular, the displays and information should be available independently from language, if possible, and only those keys should be available which are required for the respective control step.

c. At the superordinate control console 4 (central station) predetermined settings may be done effectively and in a simple manner. This applies, for example, to the inputting of the same preliminary data for several machines (machine group), to a take-over of parameters and settings from the machines, to a comparison of data and results, etc. By virtue of the fact that the control console 4, as a rule, may be used for a large number of machines, the technical outlay may be overall somewhat higher and may be optimally adapted to requirements.

d. By virtue of the possibility to nevertheless perform, if necessary, all machine-settings, parameter-settings and data recall required directly at the machine, with the aid of the mobile terminal 4b together with a corresponding graphic support, no appreciable disadvantages in the control are experienced. This is particularly so, because, as a rule, these tasks are performed deliberately and occur relatively seldom as related to the "normal operation". Further, it is almost impossible that these tasks are performed simultaneously at several machines.

e. By virtue of the small number of utilized complex structural groups, the risk of outage as well as the required spare part acquisition are significantly reduced.

f. Overall, by virtue of the system according to the invention, a practical and substantially cost-optimal solution is found without significant technical or technological limitations.

g. If very large manufacturing systems are required or are present, more than one mobile control console 4a may be used; in an extreme situation a separate one may be used for every machine.

h. The central control console 4 is a personal computer for industrial use, having a mobile control component. In this manner it is possible to perform all tasks for which corresponding devices and special instruments are required, such as, for example, the parameter-setting of digital driving components.

i. The control console 4 is further connected via a suitable device, such as a modem 16 (FIG. 6) with a telephone or other communication network 17 to make it possible to call for external information concerning the machines or to transfer data thereto (telephone service for problem searching, technical support, updates, and the like).

j. With an appropriately equipped central station 4 and/or the computers 11, 11a–11d and 30 it is possible, for example, to effect via the Internet a direct access to the machine control or assistance, or to gain access to externally stored drawings, graphs, and the like. It is advantageous to make available, maintain and store such information centrally, and then make them available for worldwide locations.

k. The central control console 4 is constructed such that it is capable of transmitting reports via the ordinary telephone network 17 or other communication networks to one or several arbitrarily designated communication devices in case of errors or other problems. As shown in FIG. 6, this applies particularly in case of handheld remote controls 18 (for example, by means of SMS), with which the maintenance personnel may be equipped for being contacted under predefined conditions via a transmitter 19. Thus, such an arrangement may also assume the function of an automatic personal paging system. A transmitter station is designated at 19.

l. In addition, the central control console 4 may control one or more signaling lamps or acoustic signaling devices. In case of a malfunction, the signal transmitters acoustically or visibly may indicate the existence of a problem and alert the maintenance personnel. A plant plan on the monitor of the central control console 4 or its mobile terminal 4b may point to the particular machine which experiences difficulties.

m. The central control console 4 may also be coupled to further networks to thus provide the possibility to establish communication with additional desired machines and devices.

n. To avoid an unnecessary burdening of the machine computer, the machine controls 11, 11a–11d and 30 may be designed such that the mobile terminal 4b has, when in use at the machine, a direct connection with the network which interconnects the machines.

o. The mobile part 4b of the central handling and indicating station 4 is coupled with the stationary part 4a by means of a serial communication (for example, Can open, Ethernet, and the like). In this manner, it may also be coupled to the individual machine controls 11, 11a–11d and 30.

p. The mobile terminal 4b as well as the input at the machines are designed such that upon coupling the mobile terminal to the machine, the required electric connections are automatically established (for example, by means of special, integrated plug-in unit).

q. The mobile terminal 4b is designed such that it has all the usual attributes of a personal computer for industrial use.

r. The control console 4 and the mobile terminals 4b communicate with one another by wireless or by infrared transmission. As a result, the terminal may be used even without a direct electrical connection practically at any desired location of the plant.

s. The standard machine terminal 8 (which is stationary at each machine) provides for the possibility for an operator to summon maintenance personnel (for example, by the handheld control unit 18) from this position, via the central control console 4 and its connection to the telephone network 17.

t. It is of particular advantage to provide that the central control console 4 and the machines connected via the network 3 have approximately the same hardware conditions and the used operating system is the same. In this manner a very simple and problem-free data exchange may be ensured.

Figure 7:
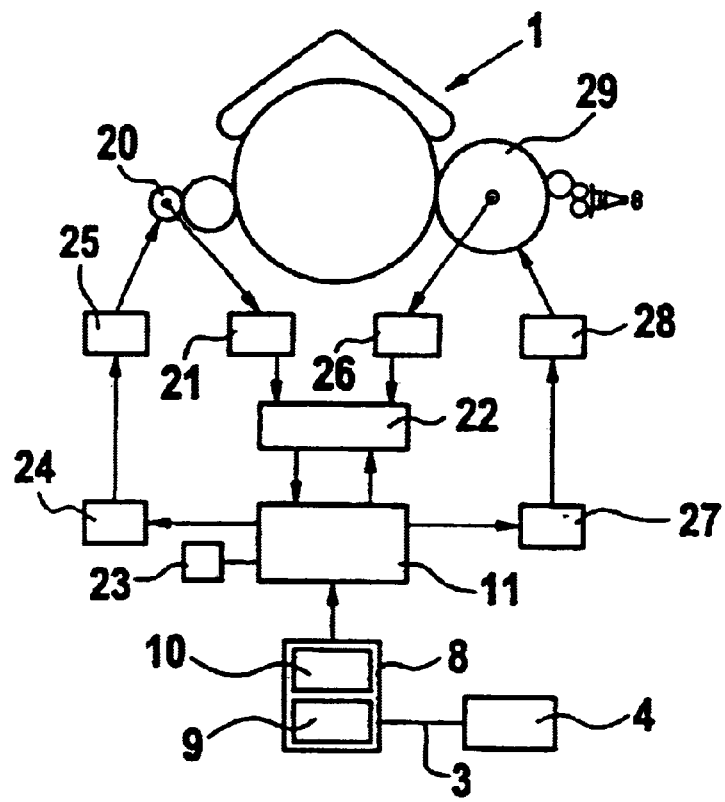
FIG. 7 is a schematic side elevational view of a carding machine with a block diagram for controlling and regulating the carding machine.

FIG. 7 illustrates a carding machine 1 having a feed roller 20 connected to an electronic tachogenerator 21 as measured value receiver. The tachogenerator 21 is connected to an analog-digital converter 22 which, in turn, is coupled with an electronic control device 11 (microcomputer) including a microprocessor with memory. The analog/digital converter 22 is controlled by the microcomputer 11 coupled to a nominal value inputter 23. The microcomputer 11 is further connected to a first digital/analog power converter 24 connected with a regulating motor 25 which drives the feed roller 20. The carding machine 1 further has a doffer 29 coupled to an electric tachogenerator 26 which functions as a measured value receiver and which is connected with the analog/digital converter 22 coupled to the microcomputer 11. The latter is also connected to a second digital/analog power converter 27 coupled to a regulating motor 28 driving the doffer 29. In operation the rpm signals of the feed roller 20 and the doffer 29 are converted into analog electric signals by the tachogenerators 21 and 26, respectively. These analog signals are converted into digital electric signals by the analog/digital converter 22 and constitute the input signals in the microcomputer 11. The microprocessor of the microcomputer 11 forms digital electric output signals from the input signals and the stored program data. These digital signals are reconverted into analog electric signals by the successive digital/analog power converters 24 and 27, respectively, and are applied thereafter to the regulating motors 25 and 28. The inputting device 9 and the monitor 10, comprised in the machine-specific control console 8 (FIG. 2), are connected to the electronic machine control and regulating device 11. One of the functions of the inputting device 9 is to switch the carding machine 1 on and off. The control console 8 of the carding machine 1 is connected by the data cable 3 to the central control console 4.

Figure 8:
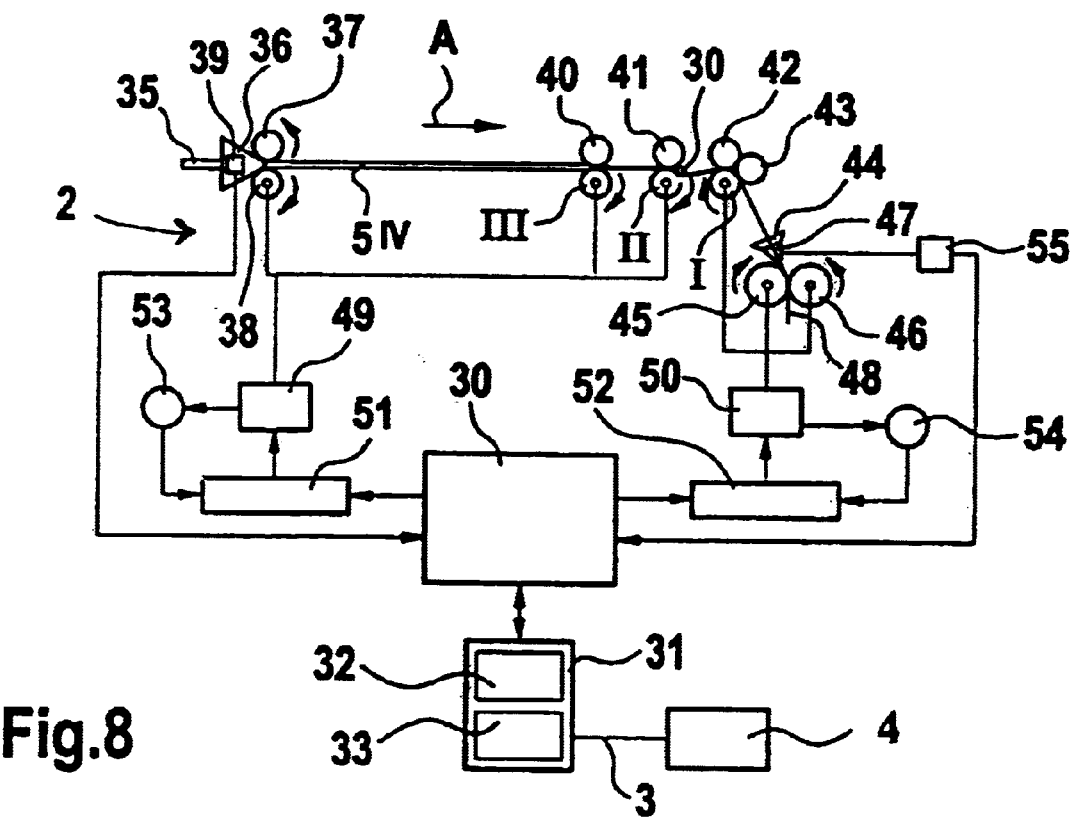
FIG. 8 is a schematic side elevational view of a draw frame with block diagram for controlling and regulating the draw frame.

FIG. 8 schematically shows a draw frame 2 in which the slivers 35 are withdrawn from non-illustrated coiler cans and enter a sliver guide 36 and pass by a measuring member 39 as they are pulled by calender rolls 37, 38 in the working direction A. The draw unit of the draw frame 2 is a 4-over-3 construction, that is, it has a lower output roll I, a lower mid roll II and a lower input roll III as well as four upper rolls 40, 41, 42 and 43. In the draw unit a drafting of the slivers is taking place, and the drafted slivers are introduced at the outlet of the draw unit into a sliver guide 44 and are, by means of calender rolls 45 and 46, pulled through a sliver trumpet 47 in which the slivers are combined into a single sliver 48 which is subsequently deposited into a non-illustrated coiler can.

The calender rolls 37, 38, the lower input roll III and the lower mid roll II which are mechanically coupled to one another, for example, by means of a tooth belt, are driven by a regulating motor 49 as a function of an inputted nominal (desired) value. The upper rolls 40 and 41 are driven by friction from the respective lower rolls. The lower output roll I and the calender rolls 45, 46 are driven by a principal motor 50. The regulating motor 49 and the principal motor 50 have a respective regulator 51 and 52. The rpm regulation is effected by a closed regulating circuit in which the regulator 51 is connected with a tachogenerator 53 and the principal motor 50 is connected with a tachogenerator 54. At the inlet of the draw unit a mass-proportionate magnitude, for example, the cross section of the slivers 35 is sensed by the measuring organ 39. At the outlet of the draw unit the cross section of the exiting sliver is obtained by a measuring organ 55 integrated in the sliver trumpet 47. A central control and regulating device 30 such as a microcomputer with a microprocessor transmits to the regulator 51 a setting of the desired magnitude for the regulating motor 49. The measured magnitudes of the two measuring organs 39 and 55 are, during the sliver drafting step, applied to the central computer unit 30. From the measured magnitude of the inlet measuring organ 39 and from the desired value for the cross section of the discharged sliver, the desired value for the regulating motor 49 is determined in the central computer 30. The measured magnitudes sensed by the outlet measuring organ 55 serve for monitoring the outputted sliver. By means of this regulating system fluctuations in the cross section of the slivers 35 may be compensated for by a suitable regulation of the drafting process, that is, an evening of the sliver may be achieved. A machine-specific control console 31 which encompasses an inputting device 32 and a monitor screen 33 is connected to the electronic machine control and regulating device 30. One of the functions of the inputting device 32 is to switch the draw frame 2 on and off. The machine-specific control console 31 of the draw frame 2 is connected to the central control console 4 by means of the data cable 3.

The invention was described in an exemplary manner in connection with a system formed of carding machines 1 and/or draw frames 2. It is to be understood that the invention may be utilized in a system formed of other spinning room machines, for example, flyers, spinning machines, spooling frames and the like.

The term superordinate characterizing the central control console 4 encompasses a functional super-ordination such that the central functions (FIGS. 3, 5a, 5b) of the superordinate (central) control console 4 for the plurality of associated machines 1, 2, 1a–1h and 2a–2c are the same. The term superordinate for central control console 4 further encompasses a structural super-ordination such that only one control console 4 or only one mobile control console 4b is present for the plurality of associated machines 1, 2, 1a–1h and 2a–2c. In this arrangement, the mobile control console 4b cooperates either with the stationary control console 4a (and its computer unit 15) or with the electronic machine control and regulating apparatus 11, 11a–11d and 30 of a machine 1, 2, 1a–1h and 2a–2c.

It will be understood that the above description of the present invention is susceptible to various modifications, changes and adaptations, and the same are intended to be comprehended within the meaning and range of equivalents of the appended claims.

What is claimed is:

1. In a control system for a group of fiber processing machines, wherein the control system includes a superordinate control console; and separate machine-specific control consoles connected to each respective fiber processing machine; the superordinate control console and the machine-specific control consoles being connected to one another by control and regulating devices via a network; the improvement comprising means for utilizing said superordinate control console for all and only for those inputs and displays which require no personal control and display acknowledgment at the machines and for utilizing said machine-specific control consoles for all and only for those inputs and displays which, for the operation of the machines require a personal control and display acknowledgement at the machines, wherein said superordinate control console comprises a stationary unit and a mobile unit removable from said stationary unit and attachable to selected fiber processing machines for data inputting and data displaying.

2. In a control system for a group of fiber processing machines, the fiber processing machines simultaneously performing operations parallel to each other, wherein the control system includes a superordinate control console; and separate machine-specific control consoles connected to each respective fiber processing machine; the superordinate control console and the machine-specific control consoles being connected to one another by control and regulating devices via a network; the improvement comprising means for utilizing said superordinate control console for all and only for those inputs and displays which require no personal control and display acknowledgment at the machines and for utilizing said machine-specific control consoles for all and only for those inputs and displays which, for the operation of the machines require a personal control and display acknowledgement at the machines.

3. The control system as defined in claim 2, wherein said superordinate control console comprises a computer for industrial use.

4. The control system as defined in claim 2, wherein said superordinate control console comprises a stationary unit and a mobile unit removable from said stationary unit and attachable to selected fiber processing machines for data inputting and data displaying.

5. The control system as defined in claim 1, wherein said stationary unit has a current supply, a system for communicating with said network, a system for data storage and data administration; and further wherein said mobile unit has a control console unit.

6. The control system as defined in claim 1, wherein said mobile unit is connectable with the control and regulating device of each said fiber processing machine, coupled by means of the network to the stationary unit.

7. The control system as defined in claim 1, wherein said mobile unit is connected to said stationary unit by means of a serial communication device.

8. The control system as defined in claim 1, further comprising wireless means for maintaining communication between said stationary and mobile units.

9. The control system as defined in claim 1, further comprising wireless means for maintaining communication between said mobile unit and the control and regulating device of a respective said fiber processing machine.

10. In a method of controlling a group of fiber processing machines that simultaneously perform operations parallel to each other by a system including a superordinate control console and separate machine-specific control consoles connected to each respective fiber processing machine; the superordinate control console and the machine-specific control consoles being connected to one another by control and regulating devices via a network; the improvement wherein the method comprises the steps of (a) utilizing said superordinate control console for all and only for those inputs and displays requiring no personal control and display acknowledgment at the machines; and (b) utilizing said machine-specific control consoles for all and only for those inputs and displays which, for the operation of the machines, require a personal control and display acknowledgement at the machines.

11. The method as defined in claim 10, further comprising the step of using said superordinate control console for superordinate input data and display.

12. The method as defined in claim 11, wherein the superordinate input data and display include one of a machine-setting, parameter setting, visual displaying and trouble-shooting.

13. The method as defined in claim 9, further comprising the step of using said superordinate control console for one of displaying, storing, exchanging and monitoring data of said fiber processing machines.

14. The method as defined in claim 10, further comprising the step of using said superordinate control console for one of preparing identical input data for a plurality of said fiber processing machines, taking over parameters and settings from said fiber processing machines and comparing data and results.

15. The method as defined in claim 10, further comprising the step of using said superordinate control console for one of setting parameters of digital driving components, technological parameter setting of said fiber processing machines and changing of machine programs.

16. The method as defined in claim 10, wherein the superordinate control console comprises a stationary unit and a mobile unit and the method further comprises removing the mobile unit from said stationary unit and attaching the mobile unit to selected fiber processing machines for data inputting and data displaying.

* * * * *